E. L. P. COLARDEAU.
ELECTRIC MOTOR.
APPLICATION FILED NOV. 13, 1919.

1,416,612.

Patented May 16, 1922.

Witnesses:

Inventor
Emmanuel L. P. Colardeau

UNITED STATES PATENT OFFICE.

EMMANUEL LOUIS PAUL COLARDEAU, OF PARIS, FRANCE, ASSIGNOR TO THE SOCIETY ETABLISSEMENTS HENRY CROCHAT, OF PARIS, FRANCE.

ELECTRIC MOTOR.

1,416,612.

Specification of Letters Patent.  Patented May 16, 1922.

Application filed November 13, 1919. Serial No. 337,747.

*To all whom it may concern:*

Be it known that I, EMMANUEL LOUIS PAUL COLARDEAU, citizen of the French Republic, residing at Paris, France, have invented certain new and useful Improvements in Electric Motors, of which the following is a specification.

The invention relates to means which enable several electric motors to be simultaneously fed from a single source of current, and to be braked simultaneously. This invention relates more particularly to means for feeding simultaneously the motors of the various vehicles of a train, and also for braking them simultaneously.

The invention mainly consists in arranging the armatures and the field magnets of each of the motors, so as to enable the same either to be connected in series and to be shunted then across the terminals of the generator, or each of the armatures to be shunted by a resistance, and the field magnets of the various motors to be connected in series in a circuit closed at the terminals of the generator.

Apart from this main arrangement, the invention comprises certain other arrangements more particularly referred to hereinafter.

The invention will now be described in detail and illustrated in the accompanying drawing by way of example. In the said drawings.

A generator $a$ is provided for driving the motors of the various vehicles. Each of the said motors is provided with an armature $b^1$, $b^2$, $b^3$ and a field magnet winding $b^{10}$, $b^{20}$, $b^{30}$.

One of the brushes of each motor is connected to a wire $c$ starting from the brush $a^1$ of the generator, and the other brush to a contact $d^1$, $d^2$, $d^3$.

At the side of each of the contacts $d^1$, $d^2$, $d^3$ is arranged another contact $d^{10}$, $d^{20}$, $d^{30}$ to which is connected one of the ends of the field magnet $b^{10}$, $b^{20}$, $b^{30}$. The other end of each field magnet is connected to a contact $e^1$, $e^2$, $e^3$.

At the side of each of these contacts is arranged another contact $e^{10}$, $e^{20}$, $e^{30}$.

The first of these contacts $e^{10}$ is connected to the brush $a^2$ of the generator, the second $e^{20}$ to the contact $e^1$, the third $e^{30}$ to the contact $e^2$, and so on, and the end of the conductor $c$ is connected to a contact $f$, the contact $e^3$ of the last motor being connected to a contact $f^1$.

Finally the brushes of the motors, which are connected to the wire $c$, are connected to one end of a resistance $g^1$, $g^2$, $g^3$ the other end being connected to a contact $d^{100}$, $d^{200}$, $d^{300}$.

In order to feed the various motors by means of the generator $a$, the contacts $d^1$ and $d^{10}$, $d^2$ and $d^{20}$ $d^3$ and $d^{30}$ must be connected and also the contacts $e^{10}$ and $e^1$, $e^{20}$ and $e^2$, $e^{30}$ and $e^3$. The armature and the field magnet of each motor are thus in series and shunted across the terminals of the generator.

When it is desired to brake the various motors, the contacts $d^1$ and $d^{100}$, $d^2$ and $d^{200}$, $d^3$ and $d^{300}$, must be connected together, thus shunting the armatures of the motors by means of a resistance. The contacts $d^{10}$ and $e^{10}$, $d^{20}$ and $e^{20}$, $d^{30}$ and $e^{30}$, are also connected together, the different field magnets being thus connected in series, after having broken the connections between the contacts $d^{10}$—$d'$, $d^{20}$—$d^2$, and $d^{30}$—$d^3$. Finally the contact $f^1$ is connected to the contact $f$, so as to close the circuit containing the generator $a$ and the various field magnets of the motors.

The strength of current in the circuit of the field magnets is then varied by any desired process; for instance, if the source of current is a constant one, resistances may be introduced, and if the source of current is a variable one, the voltage of the said source may be varied.

The connections for ensuring the running or the braking of the motors, may be effected by hand, by means of the brake applying devices mounted on the vehicles; but they may be also effected from the car carrying the generator, by means of controllers or contact devices.

Figure 3:
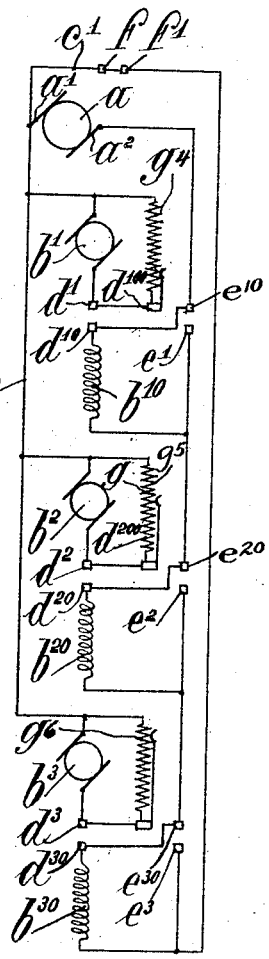
Figure 3 shows a diagram substantially similar to Figure 2, but employing variable resistances to obtain a progressive braking action.

The power of braking may also be varied by utilizing variable resistances $g^4$, $g^5$, $g^6$, as shown in Fig. 3, the amount of which can be modified at will, down to the short-circuiting of the armature.

Figure 1:
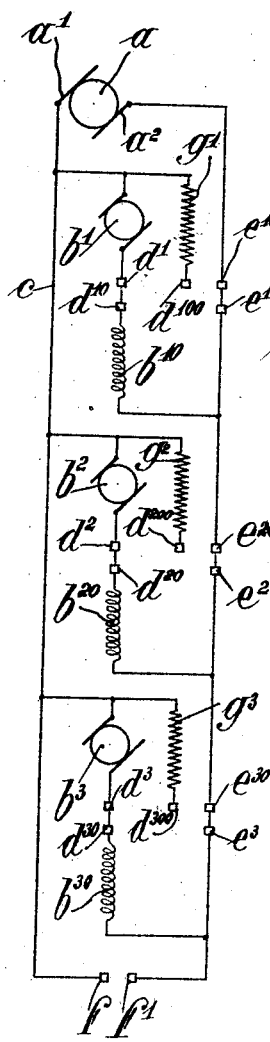
Figure 1 shows diagrammatically an installation, during the feeding of the motors.
Figure 2:
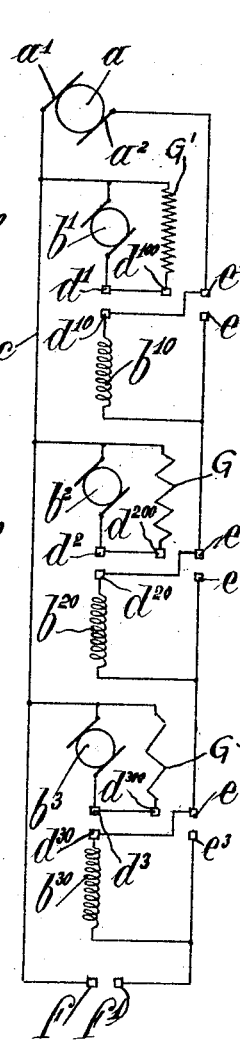
Figure 2 shows a like installation during the braking of the motors, the resistances being gradated to obtain a progressive braking action.

Preferably, moreover, the resistances of the various motors are regulated or gradated, as indicated by $G'$, $G^2$, $G^3$ in Fig. 2 so that the braking action gradually increases from the first vehicle to the last.

Again, in order to facilitate the manipulation, the contact $f$ is no longer arranged on the wire $c$, but as shown in Figure 3, on another auxiliary wire $c^1$ connected to the brush $a^1$ of the generator, and by the side of the said contact $f$ is arranged another contact $f^1$ connected to the contact $e^3$ of the last motor.

Obviously the invention is not limited to the method described, but comprises any modifications within the scope of the claim.

Having now particularly described and ascertained the nature of my said invention and in what manner the same is to be performed, I declare that what I claim is:

An electric system adapted to be applied to a train of vehicles comprising a generator, a plurality of electric motors for driving some of said vehicles, each of said motors including armature and field windings connected in series and shunted across the terminals of the generator, a resistance for each motor adapted to be shunted across the armature thereof, said resistances being arranged so that their braking actions on the armatures increase gradually from the first to the last motor driven vehicle of the train, and shiftable contacts for rendering said resistances operative and connecting the field windings of said motors in series in a circuit with the terminals of said generator.

In testimony whereof I have hereunto set my hand in presence of two subscribing witnesses.

EMMANUEL LOUIS PAUL COLARDEAU.

Witnesses:
 CHAS. P. PRESSLY,
 I. JULLIN.